(12) United States Patent
Van Essen

(10) Patent No.: US 6,409,146 B1
(45) Date of Patent: Jun. 25, 2002

(54) CHECK VALVE ARRANGEMENT FOR A DIAGNOSTIC TEST POINT

(75) Inventor: Frederick Hubert Van Essen, Brighton (AU)

(73) Assignee: Schroeder Industries, McKees Rocks, PA (US)

( * ) Notice: Subject to any disclaimer, the term of this patent is extended or adjusted under 35 U.S.C. 154(b) by 0 days.

(21) Appl. No.: 09/486,170

(22) PCT Filed: Jun. 25, 1999

(86) PCT No.: PCT/AU99/00518

§ 371 (c)(1),
(2), (4) Date: May 11, 2000

(87) PCT Pub. No.: WO99/67556

PCT Pub. Date: Dec. 29, 1999

(30) Foreign Application Priority Data

Jun. 25, 1998 (AU) .............................. PP 4328

(51) Int. Cl.[7] .................. F16K 51/00; F16K 31/44; F16K 31/00
(52) U.S. Cl. .................. 251/149.1; 251/82; 251/347
(58) Field of Search ................ 251/82, 149.1, 251/149.2, 149.4, 347, 353

(56) References Cited

U.S. PATENT DOCUMENTS

| | | | |
|---|---|---|---|
| 1,383,209 A | 6/1921 | Iftiger | |
| 1,958,698 A | 5/1934 | Fox ............... | 73/167 |
| 2,691,299 A | 10/1954 | Ward ............. | 73/118 |
| 3,116,636 A | 1/1964 | Lauck ........... | 73/168 |
| 3,715,099 A | 2/1973 | Shendure ....... | 251/149.1 |
| 3,757,836 A * | 9/1973 | Masuda .......... | 251/149.1 |
| 3,807,687 A * | 4/1974 | Thompson ...... | 251/149.6 |
| 3,825,222 A | 7/1974 | Petrova .......... | 251/149.6 |
| 4,428,560 A * | 1/1984 | Erdelsky ......... | 251/149.1 |
| 4,430,886 A | 2/1984 | Rood .............. | 73/37 |
| 4,580,453 A | 4/1986 | Taylor ............ | 73/863.86 |
| 4,638,668 A | 1/1987 | Leverberg et al. | 73/866.5 |
| 4,710,168 A * | 12/1987 | Schwab et al. ... | 604/99 |
| 4,825,945 A * | 5/1989 | Smith ............. | 166/86 |
| 4,854,181 A | 8/1989 | Gerstel .......... | 73/863.86 |
| 4,936,544 A | 6/1990 | Bartholomew .. | 251/149.6 |
| 5,172,723 A * | 12/1992 | Sturgis .......... | 137/613 |
| 5,269,771 A * | 12/1993 | Thomas et al. .. | 604/213 |
| 5,586,748 A | 12/1996 | Kish ............... | 251/149.8 |
| 5,616,129 A * | 4/1997 | Mayer ............. | 251/149.1 |
| 5,662,139 A | 9/1997 | Lish ............... | 137/523 |
| 5,722,635 A | 3/1998 | Earle .............. | 251/142.7 |
| 5,937,885 A * | 8/1999 | Sampson ........ | 251/149.1 |

FOREIGN PATENT DOCUMENTS

| | | |
|---|---|---|
| DE | 2118088 | 10/1972 |
| GB | 2258217 | 2/1993 |

* cited by examiner

Primary Examiner—Philippe Derakshani
Assistant Examiner—David A Bonderer
(74) Attorney, Agent, or Firm—Webb Ziesenheim Logsdon Orkin & Hanson, P.C.

(57) ABSTRACT

The invention provides a check valve for a test point for taking pressure measurements or fluid samples in a pressurized fluid system, said check valve including a housing having a bore and a movable valve body located in said bore, one end of said housing adapted to receive a pressure measuring probe for taking said pressure measurements or fluid samples, said one end of said housing including an upper bore section within which, in use, said pressure measuring probe is located wherein said movable valve body includes an end, located in said upper bore section, of nominal diameter less than the nominal diameter of said upper bore section. The invention further provides a check valve for a test point for taking pressure measurements or fluid samples in a pressurized fluid system, said check valve including a housing with a bore passing therethrough, a movable body located in said bore for providing opening and closing of said check valve, and a seal located on said movable valve body for providing sealing between said valve body and said bore wherein said check valve includes a collar means located or said movable valve body to support and expand sad seal. The invention also provides a test point including respective check valves.

4 Claims, 3 Drawing Sheets

CHECK VALVE ARRANGEMENT FOR A DIAGNOSTIC TEST POINT

FIELD OF THE INVENTION

The present invention relates to a valve arrangement, and in particular to a check valve arrangement for a test point for taking pressure measurements or fluid samples in pressurised fluid systems, including gaseous systems.

BACKGROUND TO THE INVENTION

Test points are used to provide testing or measuring connections for pressurised fluid lines of hydraulic or gas systems. Typically a test point is incorporated into a fluid line of a hydraulic or gas system to provide a means by which a pressure measuring device can be connected to the system in order to measure fluid pressure within the system. The test points are also used for obtaining samples of the fluid (gas or liquid) from the system without the requirement of disrupting the system to obtain the sample, and without spillage or other problems which may be encountered. The test point includes a valve arrangement, commonly known as a check valve, to provide for opening and closing of the test point.

Known check valves have included the use of a "ball valve" arrangement whereby a ball and seat arrangement provides a one-way valve which can be used to obtain pressure measurements and samples. Problems arose with the usage of such ball valves as leakage or weeping is difficult to control in such systems, particularly when gaseous fluids are being used. Poppet type valves have also been used, and these overcome some problems associated with the ball and seat arrangements.

One problem associated with known poppet type check valves of test points is that it is typical for the seal carried on the movable valve body to be pinched between the valve body and the bore of the valve housing during closing of the check valve under pressure. In particular, the seal may be distorted from its desired shape under the action of the fluid pressure and is often forced into the gap between the valve body and the valve housing during the closing of the check valve, thereby pinching the seal. This effect during closing of the check valve leads to damage of the seal and subsequent premature failure.

A further problem with known test points for pressurised fluid systems is that there is a limitation upon the fluid pressure at which the test point can be opened by hand in order to take a pressure reading. Typically, known test points have an upper limit of approximately 6000 psi (≈42 MPa) "break in" pressure; that is, it is difficult if not impossible to open the test point by hand at pressures in excess of approximately 6000 psi (≈42 MPa). This is because a worldwide standard has been developed in this field of technology, and this standard utilises a connection thread of 16mm by 2mm pitch. Any change to this thread would cause significant problems as existing tools and probe attachment apparatus would no longer fit to the new test points. As such it is generally not feasible to overcome this problem by reducing the pitch of the thread. At pressures in excess of 6000 psi (≈42 MPa) it is usually necessary to use a tool on the 16mm by 2mm pitch attachment nut in order to provide sufficient torque to the nut to subsequently provide sufficient force to the attachment probe to open the test point. Such a limitation is particularly undesirable.

It is an object of the present invention to provide a check valve arrangement for a test point for taking pressure measurements or fluid samples in a pressurised fluid system which overcomes at least one shortcoming in prior art designs of check valves.

It is also an object of the present invention to provide a test point for taking pressure measurements or fluid samples in a pressurised fluid system which overcomes at least one shortcoming in prior art designs of test points.

SUMMARY OF THE INVENTION

One aspect of the present invention includes a check valve for a test point, said check valve configured to receive a measurement probe having a probe diameter, said check valve including:
- a housing defining a stepped bore, said stepped bore defining an upper bore portion having all upper diameter and a lower bore portion having, a lower diameter, said lower diameter being less than either said upper diameter or the probe diameter, and
- a movable valve body located in said lower bore portion, said movable valve body having, a body diameter less than said upper diameter or the probe diameter.

The present invention also provides a test point for taking pressure measurements or fluid samples in a pressurised fluid system, said test point including a check valve including:
- a housing having a bore and a movable valve body located in said bore, one end of said housing adapted to receive a pressure measuring probe for taking said pressure measurements or fluid samples, said one end of said housing including a upper bore portion within which, in use, said pressure measuring probe is located,
- wherein said movable valve body includes an end located in said upper bore portion of nominal diameter less than the nominal diameter of said upper bore portion.

Advantageously this aspect of the present invention enables a smaller diameter valve body to be used in conjunction with a conventional pressure testing probe. This in turn leads to a reduction in the force required to open the check valve in order to take a pressure reading and thereby enables the check valve to be opened at higher pressures without the need for tools.

A further aspect of the present invention provides a check valve for a test point for taking pressure measurements or fluid samples in a pressurized fluid system, said check valve including:
- a housing with a bore passing therethrough;
- a movable body located in said bore for providing opening and closing of said check valve; and
- a seal located oil said movable valve body for providing a sealing between check valve body and said bore,
- wherein said check valve includes a collar means engaged on said movable valve body and movable thereon to support said seal and said collar provides a supporting surface for the seal and acts to ensure the seal maintains its desired shape under the effect of fluid pressure during, opening and closing of the check valve.

The present invention also provides a test point for taking pressure measurements or fluid samples in a pressurised fluid system, said test point including a check valve including:
- a housing with a bore passing therethrough,
- a movable valve body located in said bore for providing opening and closing of said check valve,
- a seal located on said movable valve body for providing sealing between said valve body and said bore,
- wherein said check valve includes a collar means located on said movable valve body to support said seal.

Advantageously the collar provides a supporting surface for the seal and acts to ensure the seal maintains its desired shape under the effect of fluid pressure during the opening and closing of the check valve. Preferably the collar is engaged on the valve body and movable thereon.

DESCRIPTION OF DRAWINGS

Reference is made to the accompanying drawings in which.

DISCUSSION OF PREFERRED EMBODIMENT

The present invention will be better understood and appreciated from the following discussion of the features of a preferred embodiment.

Figure 12:
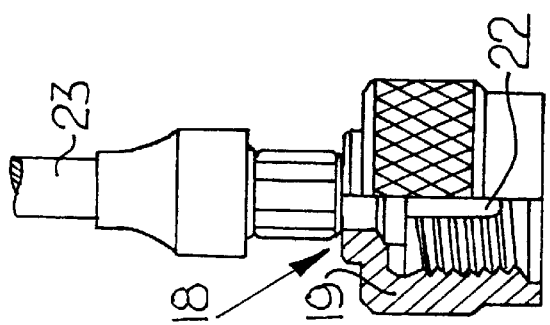
FIG. 12 is a partial cross sectioned side view of a test point attachment fitting of a fluid pressure measurement or fluid sampling device.

Referring to the sequence of FIGS. 1 to 5, a contemporary design of test point check valve is illustrated. The check valve 1 comprises a housing 2 with a longitudinal bore 3 which passes therethrough. The housing 2 may form a liner or sleeve adapted to be located inside a further, outer housing of a fully assembled test point. One end 4 of the check valve includes an opening or mouth 5 adapted to receive a connection of a fluid pressure measuring device such as that which is shown in FIG. 12.

The test point check valve further includes a valve body 6 located and slidable within the bore 3 of the housing 2. The valve body carries a seal 7, typically an O-ring seal, for sealing of the bore of the check valve. The valve body 6 includes a tapered seating surface 8 which seats upon a correspondingly tapered wall 9 of the bore when the check valve is closed. The valve body includes a cylindrical upper stem 10 which is located and guided along its length by the wall of bore 3. Typically the stem 10 has a nominal diameter of ⅛ inch (3.175 millimetres).

The sequence of FIGS. 1 to 5 illustrate the closing of the check valve, as would occur upon removal of a pressure testing probe after a pressure reading has been taken. As shown, the seal 7 is deformed under the effect of fluid pressure. In particular, the seal tends to be squeezed or forced into the gap 11 between the tapered wall 9 of the bore of the housing and the outer seating surface 8 of the valve body. As the check valve is further closed the seal is pinched in the reducing gap between the valve body and the inner wall of the valve housing. This pinching of the valve seal during closing of the check valve can result in ineffective sealing and also acts to diminish the life of the seal.

Referring to the sequence of FIGS. 6 to 11, a check valve in accordance with an embodiment of the present invention is illustrated. Those features of the check valve which correspond with features of the conventional check valve of FIGS. 1 to 5 have been provided with the same reference numerals.

The preferred embodiment of the check valve according to the present invention includes a sleeve or collar 12 which is located on the valve body 6 and movable thereon in an axial direction. The collar 12 is preferably of an annular form and is mounted upon the cylindrical stem 10 of the valve body. The stem of the valve body includes a reduced diameter portion 13 within which the collar 12 is engaged and retained. The collar 12 includes a tapered outer seating surface 14 which seats against the correspondingly tapered seating surface 9 of the bore of the housing. The collar further includes a lower planar surface 15 for supporting the 0-ring seal 7 during sealing of the check valve.

The valve body is further provided with a radially extending shoulder 16 which supports the C-ring seal and which abuts an end wall 17 of the housing when the check valve is closed.

Figure 4:
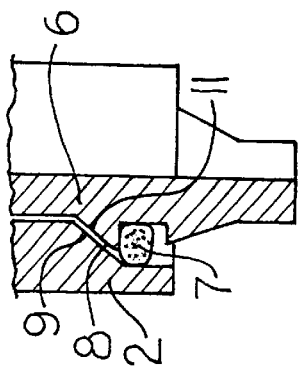
FIG. 4 is an enlarged view taken from FIG. 2, showing the valve seating and sealing arrangement and illustrating the deformation of the valve seal during closing of the check valve.
Figure 5:
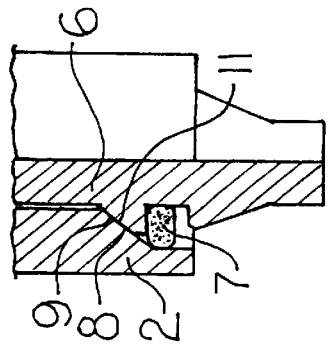
FIG. 5 is an enlarged view taken from FIG. 3, showing the valve seating and sealing arrangement when the valve is in the fully closed position.
Figure 3:
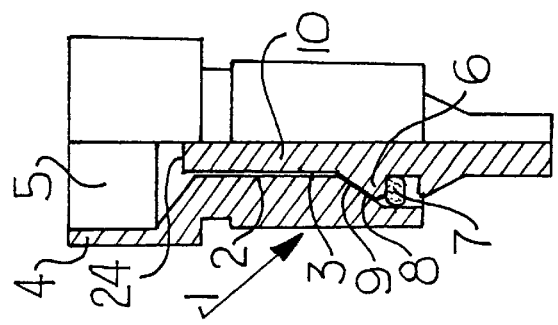
FIG. 3 is the same view of the check valve shown in FIG. 1, with the valve depicted in a fully closed position.
Figure 2:
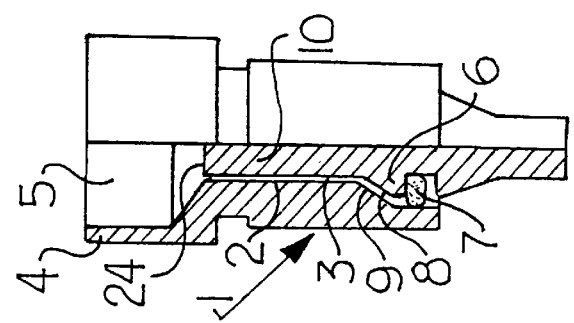
FIG. 2 is the same view of the check valve shown in FIG. 1, with the valve depicted in a partially closed position.
Figure 1:
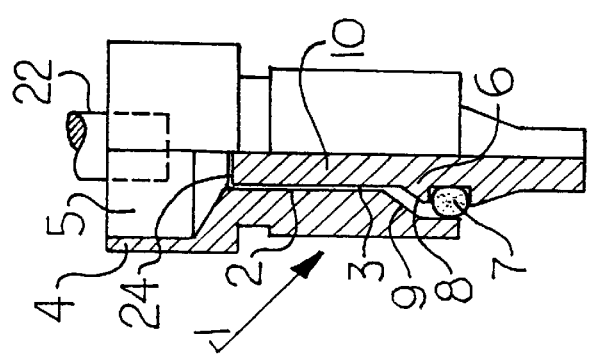
FIG. 1 is a partial cross sectioned side view of a conventional check valve arrangement for a test point, with the valve depicted in an open position.
Figure 6:
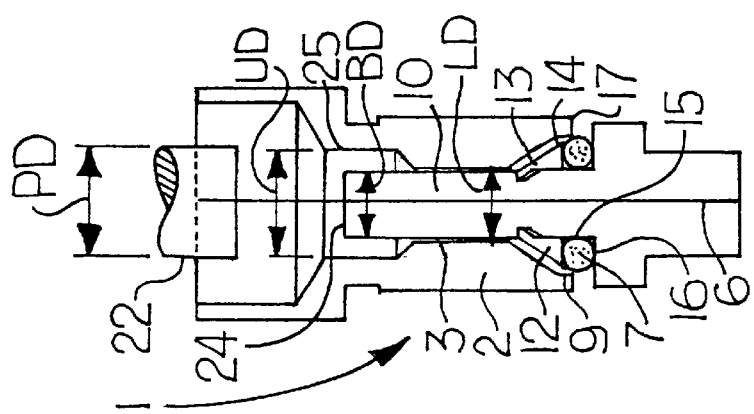
FIGS. 6 and 11 are sectional side views of a preferred embodiment of a check valve arrangement for a test point in accordance with the present invention, with the valve depicted in an open position.
Figure 7:
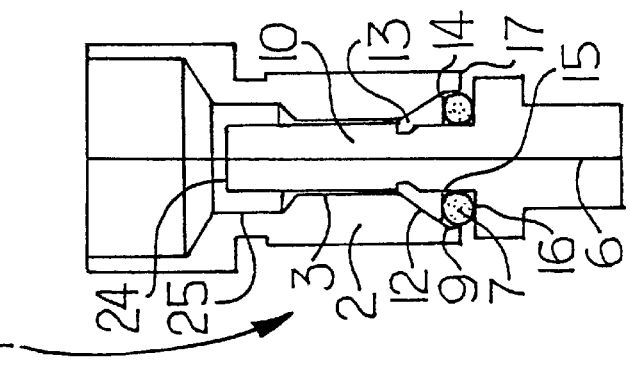
FIG. 7 is a sectional side view of the check valve arrangement shown in FIG. 6, with the valve depicted in a partially closed position.
Figure 8:
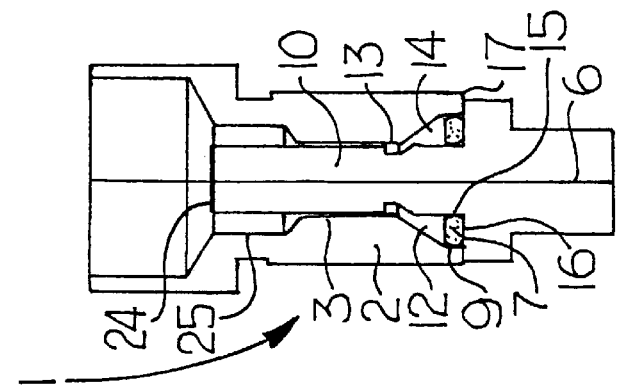
FIGS. 8 and 9 are sectional side views of the check valve arrangement shown in FIG. 6, with the valve depicted in a fully closed position.

FIGS. 6 to 8 illustrate the operation of the check valve according to the present embodiment during closing. In FIG. 6, the check valve is open with the valve body in a position such that the seal 7 is free of the wall of the bore. As the check valve closes in FIG. 7, the valve body moves upwardly amid the outer seating surface 14 of the collar 9 comes into contact with the bore wall, thereby eliminating any gaps therebetween. Further movement, as shown in FIG. 8, causes the collar 12 to be forced to a lower position on the valve stem. The seal 7 is forced longitudinally by the collar 12 causing the seal to expand radially and thus contact the bore wall. Fluid pressure acts to compact the seal into the cavity formed by the collar 12, the bore wall 9, and the valve stem 10, thereby creating a leak proof seal. Upon fully closing the check valve, the shoulder 16 of the valve body abuts the end wall 17 of the housing. During this sequence of steps, the collar provides support for the seal and maintains the seal in its desired shape and prevents pinching of the seal from occurring.

Figure 9:
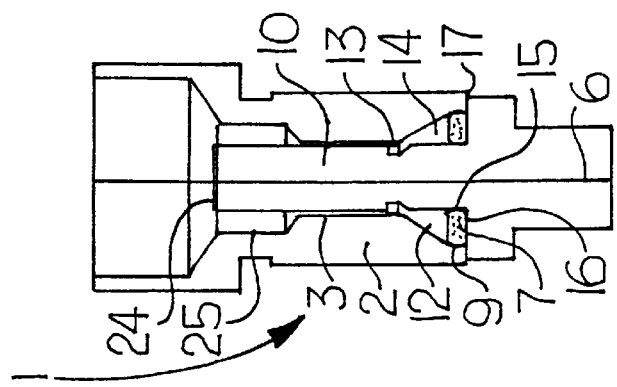
Figure 11:
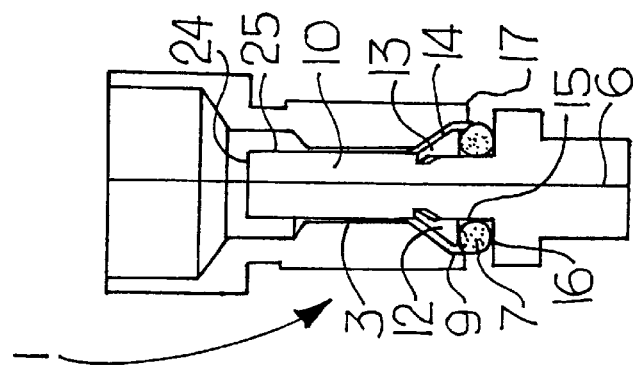
Figure 10:
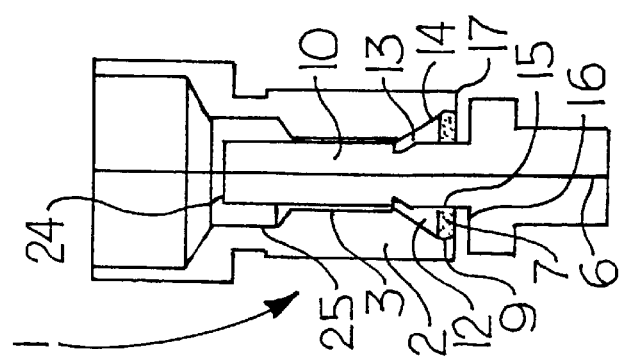
FIG. 10 is a sectional side view of the check valve arrangement shown in FIG. 6, with the valve depicted in a partially open position.

FIGS. 9 to 11 illustrate the operation of the check valve according to the present embodiment during opening. In FIG. 9 the check valve is fully closed. Upon opening, as shown in FIG. 10, the valve body moves downwardly, causing the collar 12 to move upwardly on the valve stem 10. Upon the valve body moving into a fully opened position the seal assumes an undeformed shape and fluid communication through the bore of the valve housing can occur. The collar 12 returns axially to its upper position removing radial force from the seal 7.

In this way the present invention provides an improved check valve whereby the problems of ineffective sealing of the check valve and/or premature seal failure due to pinching of the seal can be overcome.

Referring to FIG. 12, a test point connector 18 of a pressure testing device is depicted. The test point connector 18 is adapted to be fitted to a test point in order to take a pressure reading and includes an internally threaded cap 19 which is adapted to engage with a correspondingly threaded section 20 on the outer end of the outer housing 21 of the test point shown in FIG. 13. The connector 18 carries a centrally located hollow probe 22 which provides fluid communication to pressure line 23. Pressure feed line 23 is connected to a pressure measuring device to provide a reading of the fluid pressure or a sample of the fluid.

When a pressure reading is to be made, the cap 19 is screwed onto the outer threaded section 20 of the end of the test point housing 21. As the cap is screwed onto the test point housing the probe 22 comes into contact with the upper end 24 of the valve body 6 and forces the valve body downward, thereby opening the valve to enable a pressure reading or fluid sample to be taken. With the check valve open, fluid communication is established with the pressure measuring device via the probe 22 and feed line 23.

The probe 22 is typically of ⅛ inch (3.175 millimetres) nominal diameter. In prior art check valve arrangements, as typified in FIGS. 1 to 3, the outer end 24 of the valve body is also of ⅛ inch (3.175 millimetres) nominal diameter. When the probe is used with a test point incorporating a conventional check valve, the probe is located within the bore 3 of the housing 2. Conventional design to date has dictated that the bore 3 and the diameter of the upper end 24 of the valve body be of the same nominal diameter as the probe 22.

However, referring to FIG. 6, with the present embodiment the housing is provided with a upper bore section 25 which is adapted to receive and locate the probe 22. The diameter of this bore portion or section 25 is nominally ⅛ inch (3.175 millimetres). The bore has an axial dimension sufficient to receive the end of the probe 22 and to permit the probe to force the end of the valve body downwardly so as to fully open the valve. The valve body is of a diameter less than that of the bore section 25 and the nominal cross sectional area of the valve is less than the nominal cross sectional area of the probe. In arrangements where the probe 22 is provided with a tapered outer end, as shown in FIG. 12, the cross sectional area of the end of the valve stem need only be the same or marginally greater than the cross sectional area of the end of the probe. In this way, it is possible to utilise a check valve arrangement of smaller diameter than would normally be the case. In particular, it is envisaged that the diameter of the stem of the valve body would be around 2.5 millimetres and even as low as less than 2.0 millimetres. Hence the cross sectional area of the valve stem may be 70% or less than the cross sectional area of the probe whereas conventional design has dictated that the cross sectional area of the valve stem be approximately equivalent to the cross sectional area of the probe. This in turn reduces the force required to open the check valve and enables the design of check valves for use in systems with fluid pressures well in excess of 6000 psi ($\approx$42 MPa). By utilising this aspect of the present invention it is possible to provide a check valve which can be utilised in systems with fluid pressures of the order of 10,000 psi ($\approx$70 MPa) and higher which can be opened by hand without the need for tools.

Figure 13:
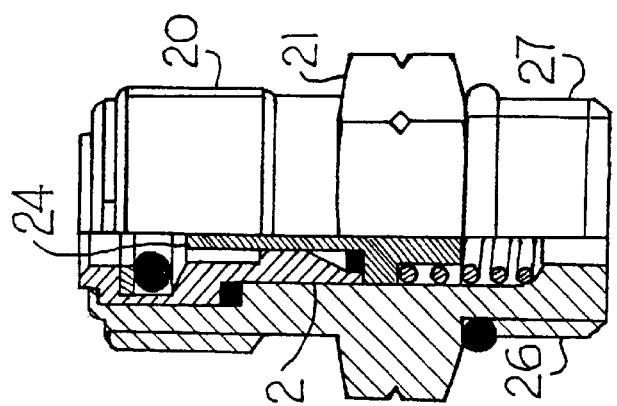
FIG. 13 is a partial cross sectioned side view of a fully assembled test point in accordance with the present invention.

FIG. 13 illustrates a fully assembled test point incorporating preferred features of the present invention. The test point includes an outer housing 21 within which are located liner 2 and valve body 6. The valve body 6 is biased to a closed position by means of a coil spring 26. One end of the outer housing 21 carries an external threaded section 27 to enable the test point to be screwed into the line of a fluid system. The opposing end of the outer housing of the test point also includes an external threaded section 20 for receiving the pressure testing probe shown in FIG. 12.

Thus it can be appreciated that present invention provides an improved check valve arrangement for a test point for taking pressure measurements or fluid samples in a pressurised fluid system.

Throughout the specification and claims, the expression "fluid" is to be taken to include all forms of fluid, including liquids and gases.

The claims defining the invention are as follows:

1. A check valve for a test point for taking pressure measurements or fluid samples in a pressurised fluid system, said check valve including:
    a housing with a bore passing therethrough,
    a movable body located in said bore for providing opening and closing of said check valve, and
    a seal located on said movable valve body for providing a sealing between said valve body and said bore,
        wherein said check valve includes a collar means engaged on said movable valve body and movable thereon to support said seal.

2. The check valve in accordance with claim 1, wherein said collar provides a supporting surface for the seal and acts to ensure the seal maintains its desired shape under the effect of fluid pressure during opening and closing of the check valve.

3. A test point for taking pressure measurements or fluid samples in a pressurised fluid system. said test point comprising:
    an outer housing, and
    a check valve located in said outer housing, said check valve comprising:
        a housing with a bore passing therethrough,
        a movable body located in said bore for providing opening and closing of said check valve, and
        a seal located on said movable valve body for providing sealing between said valve body and said bore,
            wherein said check valve includes a collar means engaged on said movable valve body and movable thereon to support said seal.

4. The test point in accordance with claim 3, wherein said collar provides a supporting surface for the seal and acts to ensure the seal maintains its desired shape under the effect of fluid pressure during opening and closing of the check valve.

* * * * *

UNITED STATES PATENT AND TRADEMARK OFFICE
CERTIFICATE OF CORRECTION

PATENT NO. : 6,409,146 B1
DATED : June 25, 2002
INVENTOR(S) : Frederick Hubert Van Essen It is certified that error appears in the above-identified patent and that said Letters Patent is hereby corrected as shown below:

Column 2,
Line 48, "oil" should read -- on --.
Line 49, "check" should read -- said --.

Column 4,
Line 42, "amid" should read -- and --.

Signed and Sealed this

Twenty-eighth Day of January, 2003

JAMES E. ROGAN
*Director of the United States Patent and Trademark Office*